US012100870B2

(12) United States Patent
Zhou et al.

(10) Patent No.: US 12,100,870 B2
(45) Date of Patent: Sep. 24, 2024

(54) FUEL CELL BIPOLAR PLATE FLOW FIELD HAVING REGULAR REPRESENTATIVE ELEMENTARY VOLUMES

(71) Applicant: Toyota Motor Engineering & Manufacturing North America, Inc., Plano, TX (US)

(72) Inventors: Feng Zhou, Ann Arbor, MI (US); Yuqing Zhou, Ann Arbor, MI (US); Danny J. Lohan, Northville, MI (US); Ercan M. Dede, Ann Arbor, MI (US); Hiroshi Ukegawa, South Lyon, MI (US); Tomoki Tambo, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 179 days.

(21) Appl. No.: 17/459,639

(22) Filed: Aug. 27, 2021

(65) Prior Publication Data

US 2023/0065250 A1   Mar. 2, 2023

(51) Int. Cl.
*H01M 8/0258* (2016.01)
*H01M 8/10* (2016.01)

(52) U.S. Cl.
CPC .......... *H01M 8/0258* (2013.01); *H01M 8/10* (2013.01)

(58) Field of Classification Search
CPC ........ H01M 8/0258; H01M 8/10; Y02E 60/50
See application file for complete search history.

(56) References Cited

U.S. PATENT DOCUMENTS

| 7,718,298 | B2 | 5/2010 | Tighe et al. |
| 2020/0266454 | A1 | 8/2020 | Nomura et al. |
| 2021/0064715 | A1 | 3/2021 | Dede et al. |

OTHER PUBLICATIONS

Kim et al., "Topology optimization of gas flow channel routes in an automotive fuel cell," International Journal of Automotive Technology, 2012, pp. 783-789.
Iranzo et al., "Biomimetic flow fields for proton exchange membrane fuel cells: A review of design trends." Energy 190, 2020, 37 pages.
Dede, Ercan M., et al., "Inverse design of microchannel fluid flow networks using Turing pattern dehomogenization", Structural and Multidisciplinary Optimization, published online May 12, 2020, Springer, 8 pages.
Zhou, Yuqing, et al., "Inverse design of microreactor flow fields through anisotropic porous media optimization and dehomogenization", Chemical Engineering Journal, Jan. 2022, 11 pages.

*Primary Examiner* — Helen Oi K Conley
(74) *Attorney, Agent, or Firm* — Jordan IP Law, LLC (57) ABSTRACT

A bipolar plate for a fuel cell, a fuel cell, and a method of designing a bipolar plate for a fuel cell having a flow field structure that includes a plurality of Representative Elementary Volumes (REVs) generated based on flow patterns generated by homogenized anisotropic porous media optimization. The flow field structure enhances fuel cell performance by facilitating lower pressure drop via minimized fluid flow resistance, and removal of accumulated water in the oxygen channel and the gas diffusion layer (GDL) under the ribs of the bipolar plate.

18 Claims, 6 Drawing Sheets

FIG. 12

FUEL CELL BIPOLAR PLATE FLOW FIELD HAVING REGULAR REPRESENTATIVE ELEMENTARY VOLUMES

TECHNICAL FIELD

Embodiments relate generally to one or more flow field structures for a fuel cell bipolar plate on the cathode side and for a slow separator on the anode side. Each flow field structure includes a plurality of representative elementary volumes (REVs) of varying sizes and flow orientations based on flow patterns generated by topology optimization.

BACKGROUND

Water management in each cell plays a key role in enhancing the power generation performance of a fuel cell (FC) by ensuring adequate diffusion of $O_2$ to the catalyst layer (CL). Therefore, the cathode of a bipolar plate design, which defines the air flow field structure, is important to promote water drainage and air diffusion.

One FC flow field structure generally uses straight channels, which allows a simple structure that can be manufactured using conventional stamping technology to lower the cost for mass production. The straight channels for the cathode side flow field, however, require wide ribs to contact the gas diffusion layer (GDL). The ribs are susceptible to water accumulation or saturation (i.e., flooding), which adversely affects $O_2$ diffusion and causes non-uniform power generation. Moreover, although the straight channels facilitate low pressure loss, this design is consequently susceptible to flooding by the accumulation of water. Flooding inhibits gas flows, thereby affecting gas distribution between cell layers and voltage stability.

An alternative design concept to the use of straight channels is the use of porous metal flow fields such as foamed sintered compacts that remove generated water from the membrane electrode and gas diffusion layer assembly (MEGA) by capillary force through minute holes. Use of porous metal flow fields, however, presents issues with include high pressure loss, excessive amounts of residual water inside the pores, unstable product quality, and high manufacturing costs.

Another alternate design concept is the use of three dimensional (3D) fine-mesh flow field for the cathode. The 3D fine-mesh flow field includes a 3D micro-lattice that directs air toward the MEGA and promotes $O_2$ diffusion to the CL. Geometry and surface wettability of the 3D fine-mesh flow field draw water generated by the MEGA to a back surface of the 3D fine-mesh flow field. Use of 3D fine mesh flow channels, however, increase the overall number of parts, increase manufacturing costs, and generate additional pressure loss across the FC.

A design having interdigitated flow fields creates flow channels that are generally not continuous from the inlet to the outlet. Because the flow channels are dead-ended, the fluid flow is forced under pressure to flow through a porous GDL layer and catalyst layer in order to reach adjacent flow channels fluidically connected to the outlet. Although this design removes water effectively from the electrode structure, all the flow and generated water upstream of the flow field are forced to flow through the porous electrode layer, which results in high flow pressure drop and channel flooding.

BRIEF SUMMARY

To address the aforementioned limitations, one or more embodiments set forth, described, and/or illustrated herein present one or more flow field structures for a fuel cell (FC) bipolar plate on the cathode side and a slow separator on the anode side. Such flow field structures are designed, in accordance with one or more embodiments, by applying topology optimization to generate flow patterns that facilitate greater uniform power generation via reaction uniformity across the FC bipolar plate. The flow field patterns also facilitate lower pressure drop via minimized fluid flow resistance across the FC bipolar plate, and removal of accumulated water in the oxygen channel and the gas diffusion layer (GDL) under the ribs of the FC bipolar plate.

In accordance with one or more embodiments, one or more example flow field structures are generated based on flow field optimization. The flow field structures comprise a plurality of representative elementary volumes (REVs) of varying sizes that are fluidically connected to the inlet and the outlet to map a flow field generated by topology optimization. The flow field structures solve performance issues of other topology optimized structures to facilitate greater air flow under the rib and water drainage from the fuel cell stack. The REV structure may be rotated at a certain angle in order to correspond to the flow field patterns generated by homogenized anisotropic porous media optimization.

In accordance with one or more embodiments, each REV comprises a main or primary channel having a plurality of branch or secondary channels branching therefrom. A first end of each, respective branch channel is fluidically connected at a first connection interface to the main channel, while a second end of each, respective branch channel is fluidically connected at a second connection interface to the main channel. The branch channels have different channel lengths with respect to each other. Consequently, the branch or secondary channels generate different pressure levels. The pressure differential between branch channels promote or otherwise facilitates fluid flow through the electrode layer under the ribs of the FC bipolar plate. The pressure differential is adjustable by creating flow field structures having varying channel widths for each branch channels. Each REV may comprise a regular channel shape, which is favorable for low cost fabrication.

The use of a flow field structure comprising a plurality of REVs (that may be repeated throughout the flow field) also creates fluidic continuity from the inlet to the without any dead ends, and thus, facilitates enhanced water drainage. The REVs facilitate air flow under the ribs to increase the $O_2$ concentration under the GDL in a manner that generates higher $O_2$ concentration at the surface of the catalyst layer for chemical reaction, which in turn generates greater electric density. Enhanced air flow under the rib also facilitates a reduction in water accumulation or saturation under the ribs. By avoiding water blockage in the GDL, greater $O_2$ concentration can be reached at the catalyst layer.

In accordance with one or more embodiments, the REVs may have different sizes at different regions of the flow field to correspond to the flow resistance map of the optimized flow field. Alternatively or additionally, the REVs may have different orientations at different regions of the flow field to correspond to the flow resistance map of the optimized flow field. In that way, FC performance objectives of reduced pressure drop across the FC and uniform power generation is maintained. Because the flow field structure may be applied to both the cathode side and the anode side of the FC, only one bipolar design is needed for the FC stack to minimize the overall number of different parts for mass production.

In accordance with one or more embodiments, a bipolar plate for a fuel cell, comprises a bipolar plate body having an inlet region, an outlet region, and a flow field structure comprising a plurality of representative elementary volumes (REVs) fluidically connected to the inlet region and the outlet region, the REVs having a structure based on flow patterns generated by homogenized anisotropic porous media optimization.

In accordance with one or more embodiments, a bipolar plate fuel cell comprises a multi-layer electrolyte structure interposed between a pair of bipolar plates, each fuel cell bipolar plate comprising a bipolar plate body having an inlet region, an outlet region, and a flow field structure comprising a plurality of representative elementary volumes (REVs) fluidically connected to the inlet region and the outlet region, the REVs having a structure based on flow patterns generated by homogenized anisotropic porous media optimization.

In accordance with one or more embodiments, a method of designing a fluid flow field for a bipolar plate of a fuel cell comprises optimizing, by one or more computing devices having one or more processors, homogenized anisotropic porous media by iteratively executing a gradient-based algorithm that incorporates objective functions of reaction variation and flow resistance; and generating, based on the homogenized anisotropic porous media optimization, a flow field structure comprising a plurality of representative elementary volumes (REVs) fluidically connected to an inlet region and an outlet region of a bipolar plate body.

BRIEF DESCRIPTION OF THE SEVERAL VIEWS OF THE DRAWINGS

The various advantages of the one or more embodiments will become apparent to one skilled in the art by reading the following specification and appended claims, and by referencing the following drawings, in which:

DETAILED DESCRIPTION

Figure 1:
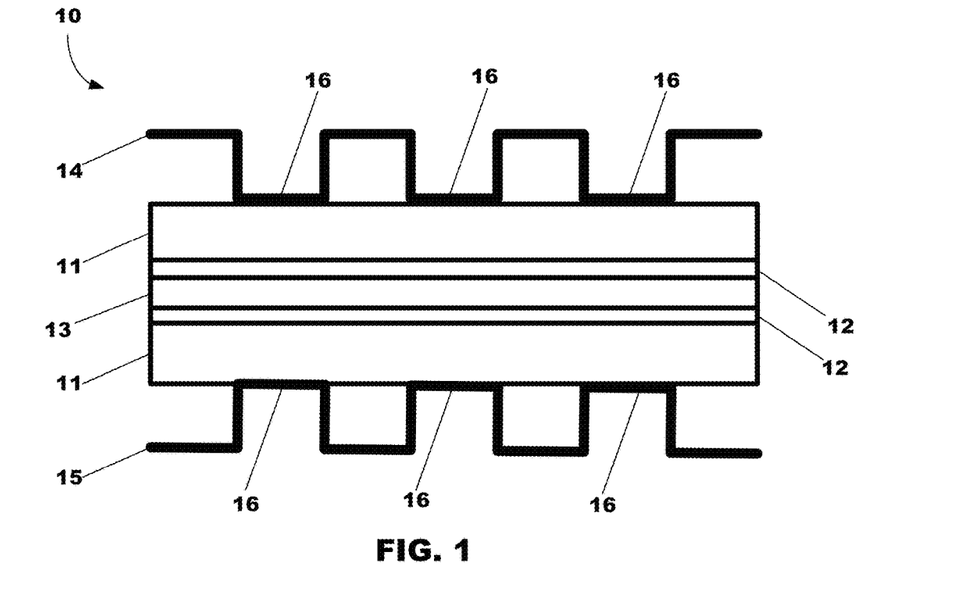
FIG. 1 illustrates a configuration of an FC, in accordance with one or more embodiments shown and described herein.

In the illustrated example embodiment of FIG. 1, a fuel cell (FC) 10 comprises a multi-layer electrolyte structure that includes a pair of gas diffusion layers (GDL) 11, a pair of catalyst layers 12, and a membrane 13 interposed between a pair of bipolar plates 14, 15 serving as electrodes. The bipolar plates 14, 15 have flow channel flow ribs 16 that when in a stacked formation of the air layer and the hydrogen layer of FC cells 10, define a channel through which a coolant flows.

Figure 2:
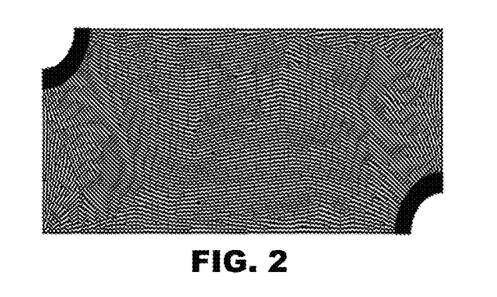
FIG. 2 illustrates an example flow field generated by homogenized anisotropic porous media optimization, in accordance with one or more embodiments shown and described herein.
Figure 3:
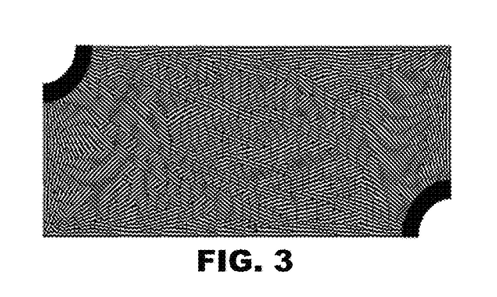
FIG. 3 illustrates an example flow field generated by homogenized anisotropic porous media optimization, in accordance with one or more embodiments shown and described herein.
Figure 4:
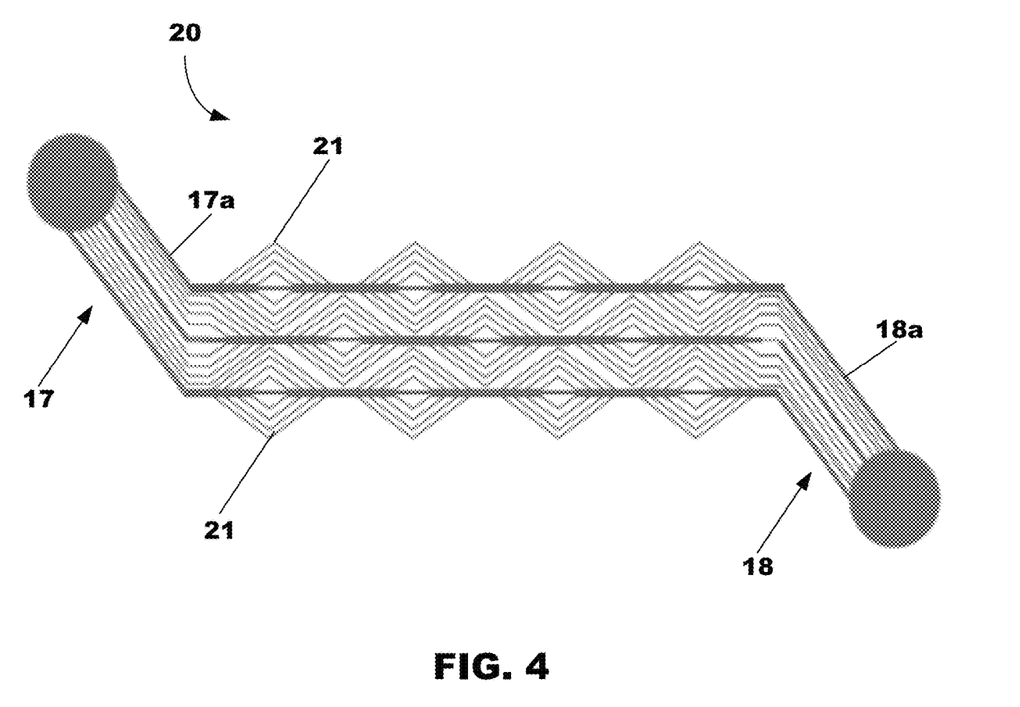
FIG. 4 illustrates a flow field structure comprising a plurality of REVs, in accordance with one or more embodiments shown and described herein.

In the illustrated example embodiment of FIG. 4, the active surface of each bipolar plate 14, 15 has a flow field 20 comprising a plurality of representative elementary volumes (REVs) 21 fluidically connected to an inlet region 17 and an outlet region 18 of the bipolar plates 14, 15. In one more embodiments, the REVs 21 are based on flow fields generated by topology optimization to enhance overall reaction performance (i.e., enhanced reaction uniformity though the FC 10) and fluid flow performance (i.e., reduced fluid flow resistance though the FC 10). A first example flow field generated by topology optimization is illustrated in FIG. 2, and a second example flow field generated by topology optimization is illustrated in FIG. 3. Such example flow fields are not limited thereto, and thus, this disclosure contemplates flow fields having any configuration that falls within the spirit and scope of the principles of this disclosure set forth, illustrated, and/or described herein. The use of a flow field structure comprising a plurality of REVs 21 (that may be repeated throughout the flow field) creates fluidic continuity from the inlet region 17 to the outlet region 18 without any dead ends, and thus, facilitates enhanced water drainage. The REVs 21 also facilitate more uniform power generation, lower pressure drops through the FC 10, and facilitates removal of accumulated water in the oxygen channel and gas diffusion layer (GDL) under the ribs 16.

In accordance with one or more embodiments, at the inlet region 17, fluid flows to the flow field 20 via one or more feed channels 17a and flows from the flow field 20 to the outlet region 18 via one or more exit channels 18a. One or more of the feed channels 17a and the exit channels 18a may have varying sizes relative to each other to facilitate different pressure levels, but embodiments are not limited thereto. This disclosure contemplates any configuration of feed channels and exit channels that falls within the spirit and scope of the principles of this disclosure set forth, illustrated, and/or described herein.

In accordance with one or more embodiments, one or more REVs may comprise different 2D geometric shapes/cross-sections at different regions of the flow field 20 based on the homogenized anisotropic porous media optimization. Such 2D geometric shapes/cross-sections include, but are not limited to, various types of polygon configurations.

Figure 5:
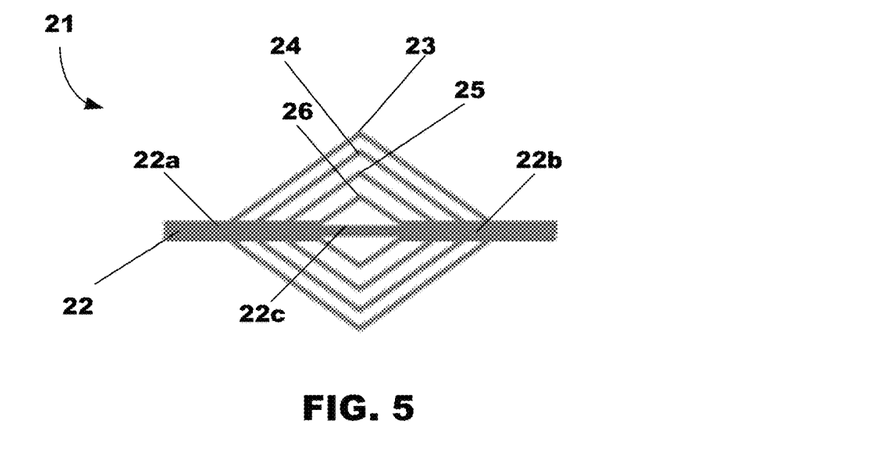
FIG. 5 illustrates an example of an REV, in accordance with one or more embodiments shown and described herein.

In the illustrated example embodiment of FIG. 5, each REV 21 comprises a generally quadrilateral 2D geometric configuration through which a main or primary channel 22 bisects. The main channel 22 has a plurality of branch or secondary channels 23, 24, 25, 26 branching therefrom. In the illustrated embodiment, the main channel 22 comprises a first channel region 22a, a second channel region 22b, and an intermediary channel region 22c between the first channel region 22a and the second channel region 22b. The first channel region 22a and the second channel region 22b have respective channel widths that are greater than the channel width of the intermediary channel region 22c, which generate different pressure levels through the main channel 22. Such a configuration of the first channel region 22a, the second channel region 22b, and the intermediary channel region 22c is not limited thereto, and thus, this disclosure contemplates any configuration of flow channels that falls within the spirit and scope of the principles of this disclosure set forth, illustrated, and/or described herein. For example, the first channel region 22a, the second channel region 22b, and the intermediary channel region 22c may have the same channel widths based on an optimized flow field design. Distal ends of each, respective branch channel 23, 24, 25, 26 are fluidically connected at different regions of the main channel 22. In the illustrated example embodiment of FIG. 5, a first end of each, respective branch channel 23, 24, 25, 26 is fluidically connected at a first connection interface to the first region 22a while a second end of each, respective branch channel is fluidically connected at a second connection interface to the second region 22b. By virtue of the branch channels 23, 24, 25, 26 having different channel lengths with respect to each other, different pressure levels are generated through the flow field 20. The pressure differential between branch channels 23, 24, 25, 26 promotes or otherwise facilitates fluid flow through the electrode layer under the ribs 16 of the FC bipolar plate 14, 15. The pressure differential is adjustable by creating optimized flow field structures having varying channel widths for each branch channels 23, 24, 25, 26.

In accordance with one or more embodiments, the size of one or more REVs may be scaled at different regions of the flow field 20 based on the homogenized anisotropic porous media optimization.

Figure 6:
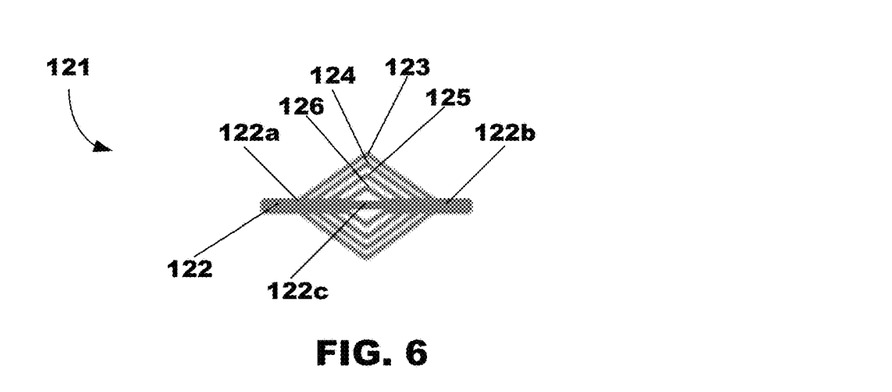
FIG. 6 illustrates an example REV having a scaled-down size, in accordance with one or more embodiments shown and described herein.

Alternatively or additionally, in the illustrated example embodiment of FIG. 6, each REV 121 is scaled-down (i.e., decreased) in size (e.g., relative to the REV 21 of FIG. 5) to comprise a generally quadrilateral 2D geometric configuration through which a main or primary channel 122 bisects. The main channel 122 has a plurality of branch or secondary channels 123, 124, 125, 126 branching therefrom. In the illustrated embodiment, the main channel 122 comprises a first channel region 122a, a second channel region 122b, and an intermediary channel region 122c between the first channel region 122a and the second channel region 122b. The first channel region 122a and the second channel region 122b have respective channel widths that are greater than the channel width of the intermediary channel region 122c, which generate different pressure levels through the main channel 122. Distal ends of each, respective branch channel 123, 124, 125, 126 are fluidically connected at different regions of the main channel 122. A first end of each, respective branch channel 123, 124, 125, 126 is fluidically connected at a first connection interface to the first region 122a while a second end of each, respective branch channel is fluidically connected at a second connection interface to the second region 122b. By virtue of the branch channels 123, 124, 125, 126 having different channel lengths with respect to each other, different pressure levels are generated through the flow field. The pressure differential between branch channels 123, 124, 125, 126 promotes or otherwise facilitates fluid flow through the electrode layer under the ribs 16 of the FC bipolar plate 14, 15. The pressure differential is adjustable by creating optimized flow field structures having varying channel widths for each branch channels 123, 124, 125, 126.

Figure 7:
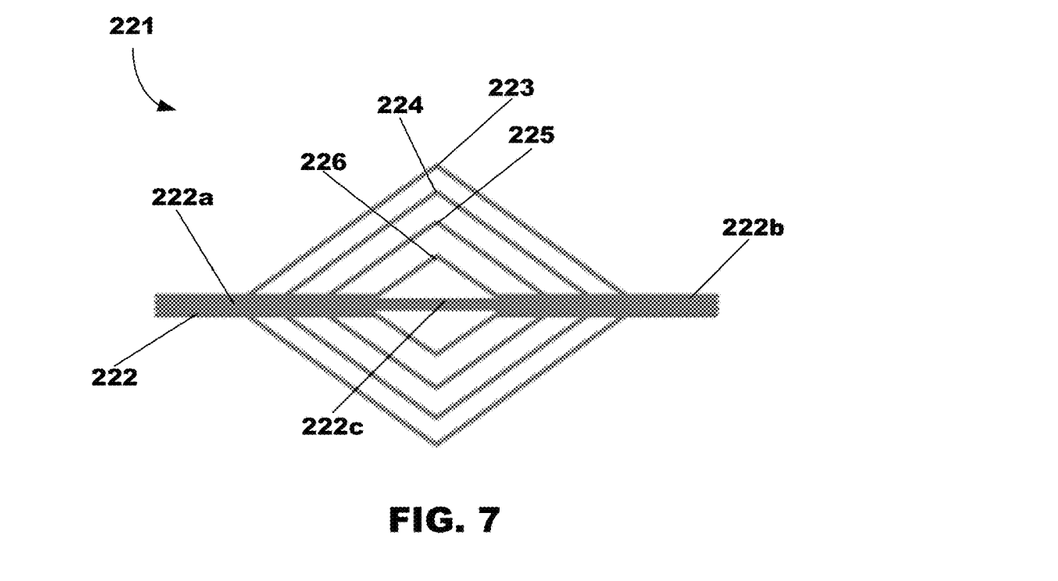
FIG. 7 illustrates an example REV having a scaled-up size, in accordance with one or more embodiments shown and described herein.

Alternatively or additionally, in the illustrated example embodiment of FIG. 7, each REV 221 is scaled-up (i.e., increased) in size (e.g., relative to the REV 21 of FIG. 5) to comprise a generally quadrilateral 2D geometric configuration through which a main or primary channel 222 bisects. The main channel 222 has a plurality of branch or secondary channels 223, 224, 225, 226 branching therefrom. In the illustrated embodiment, the main channel 222 comprises a first channel region 222a, a second channel region 222b, and an intermediary channel region 222c between the first channel region 222a and the second channel region 222b. The first channel region 222a and the second channel region 222b have respective channel widths that are greater than the channel width of the intermediary channel region 222c, which generate different pressure levels through the main channel 222. Distal ends of each, respective branch channel 223, 224, 225, 226 are fluidically connected at different regions of the main channel 222. A first end of each, respective branch channel 223, 224, 225, 226 is fluidically connected at a first connection interface to the first region 222a while a second end of each, respective branch channel is fluidically connected at a second connection interface to the second region 222b. By virtue of the branch channels 223, 224, 225, 226 having different channel lengths with respect to each other, different pressure levels are generated through the flow field. The pressure differential between branch channels 223, 224, 225, 226 promotes or otherwise facilitates fluid flow through the electrode layer under the ribs 16 of the FC bipolar plate 14, 15. The pressure differential is adjustable by creating optimized flow field structures having varying channel widths for each branch channels 223, 224, 225, 226.

Alternatively or additionally, one or more REVs may have different orientations at different regions of the flow field based on the homogenized anisotropic porous media optimization.

Figure 8:
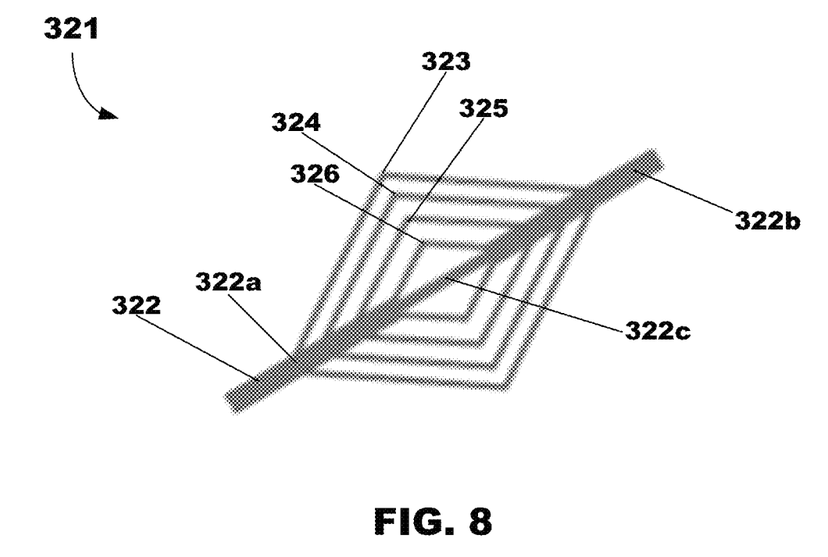
FIG. 8 illustrates an example REV having a generally angular orientation relative to a horizontal plane, in accordance with one or more embodiments shown and described herein.

In the illustrated example embodiment of FIG. 8, each REV 321 has a generally angular orientation relative to a horizontal plane (i.e., between approximately 0-90 degrees) to comprise a generally quadrilateral 2D geometric configuration through which a main or primary channel 322 bisects. The main channel 322 has a plurality of branch or secondary channels 323, 324, 325, 326 branching therefrom. In the illustrated embodiment, the main channel 322 comprises a first channel region 322a, a second channel region 322b, and an intermediary channel region 322c between the first channel region 322a and the second channel region 322b. The first channel region 322a and the second channel region 322b have respective channel widths that are greater than the channel width of the intermediary channel region 322c, which generate different pressure levels through the main channel 322. Distal ends of each, respective branch channel 323, 324, 325, 326 are fluidically connected at different regions of the main channel 322. A first end of each, respective branch channel 323, 324, 325, 326 is fluidically connected at a first connection interface to the first region 322a while a second end of each, respective branch channel is fluidically connected at a second connection interface to the second region 322b. By virtue of the branch channels 323, 324, 325, 326 having different channel lengths with respect to each other, different pressure levels are generated through the flow field. The pressure differential between branch channels 323, 324, 325, 326 promotes or otherwise facilitates fluid flow through the electrode layer under the ribs 16 of the FC bipolar plate 14, 15. The pressure differential is adjustable by creating optimized flow field structures having varying channel widths for each branch channels 323, 324, 325, 326.

Figure 9:
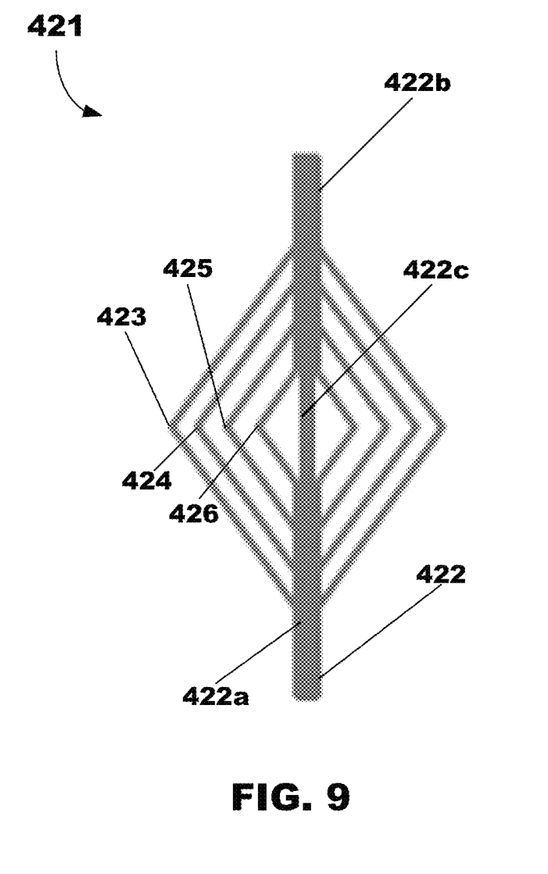
FIG. 9 illustrates an example REV having a generally perpendicular orientation relative to a horizontal plane, in accordance with one or more embodiments shown and described herein.

In the illustrated example embodiment of FIG. 9, each REV 421 has a generally perpendicular orientation relative to a horizontal plane (i.e., approximately 90 degrees) to comprise a generally quadrilateral 2D geometric configuration through which a main or primary channel 422 bisects. The main channel 422 has a plurality of branch or secondary channels 423, 424, 425, 426 branching therefrom. In the illustrated embodiment, the main channel 422 comprises a first channel region 422a, a second channel region 422b, and an intermediary channel region 422c between the first channel region 422a and the second channel region 422b. The first channel region 422a and the second channel region 422b have respective channel widths that are greater than the channel width of the intermediary channel region 422c, which generate different pressure levels through the main channel 422. Distal ends of each, respective branch channel 423, 424, 425, 426 are fluidically connected at different regions of the main channel 322. A first end of each, respective branch channel 423, 424, 425, 426 is fluidically connected at a first connection interface to the first region 422a while a second end of each, respective branch channel is fluidically connected at a second connection interface to the second region 422b. By virtue of the branch channels 423, 424, 425, 426 having different channel lengths with respect to each other, different pressure levels are generated through the flow field. The pressure differential between branch channels 423, 424, 425, 426 promotes or otherwise facilitates fluid flow through the electrode layer under the ribs 16 of the FC bipolar plate 14, 15. The pressure differential is adjustable by creating optimized flow field structures having varying channel widths for each branch channels 423, 424, 425, 426.

Figure 10:
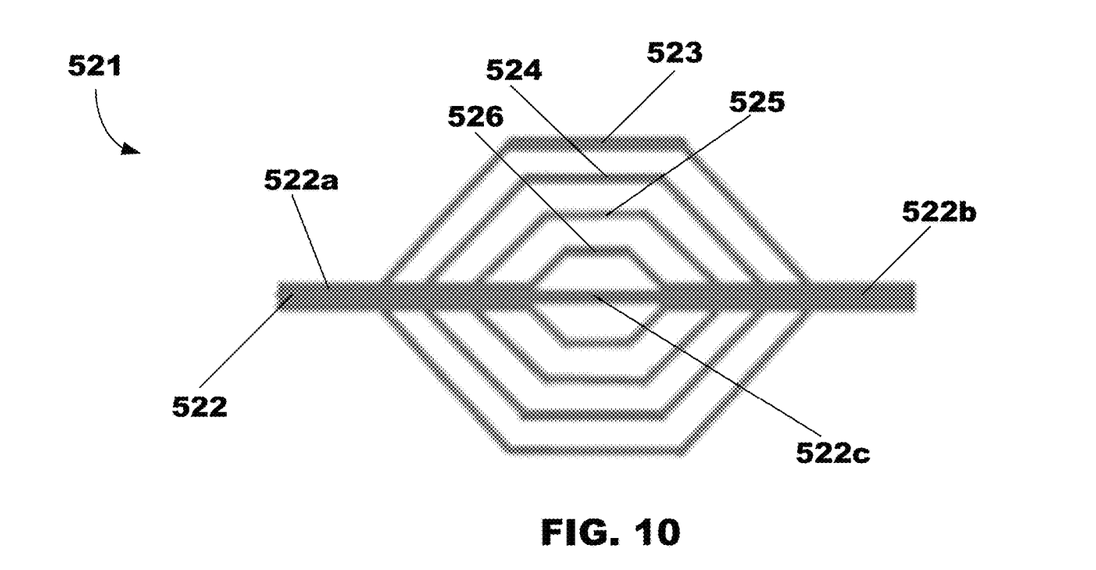
FIG. 10 illustrates an example REV having a generally hexagonal two-dimensional (2D) geometric configuration, in accordance with one or more embodiments shown and described herein.

In the illustrated example embodiment of FIG. 10, the REV 521 comprises a generally hexagonal 2D geometric configuration through which a main or primary channel 522 bisects. A plurality of branch or secondary channels 523, 524, 525, 526 branch from the main channel 522. In the illustrated embodiment, the main channel 522 comprises a first channel region 522a, a second channel region 522b, and an intermediary channel region 522c extending between the first channel region 522a and the second channel region 522b. The first channel region 522a and the second channel region 522b have respective channel widths that are greater than the channel width of the intermediary channel region 522c, which generates different pressure levels through the main channel 522. Distal ends of each, respective branch channel 523, 524, 525, 526 are fluidically connected at different regions of the main channel 522. A first end of each, respective branch channel 523, 524, 525, 526 is fluidically connected at a first connection interface to the first region 522a while a second end of each, respective branch channel is fluidically connected at a second connection interface to the second region 522b. By virtue of the branch channels 523, 524, 525, 526 having different channel lengths with respect to each other, different pressure levels are generated therethrough the REV 521. The pressure differential between branch channels 523, 524, 525, 526 promotes or otherwise facilitates fluid flow through the electrode layer under the ribs 16 of the FC bipolar plate 14, 15. The pressure differential is adjustable by creating optimized flow field structures having varying channel widths for each branch channels 523, 524, 525, 526.

Figure 11:
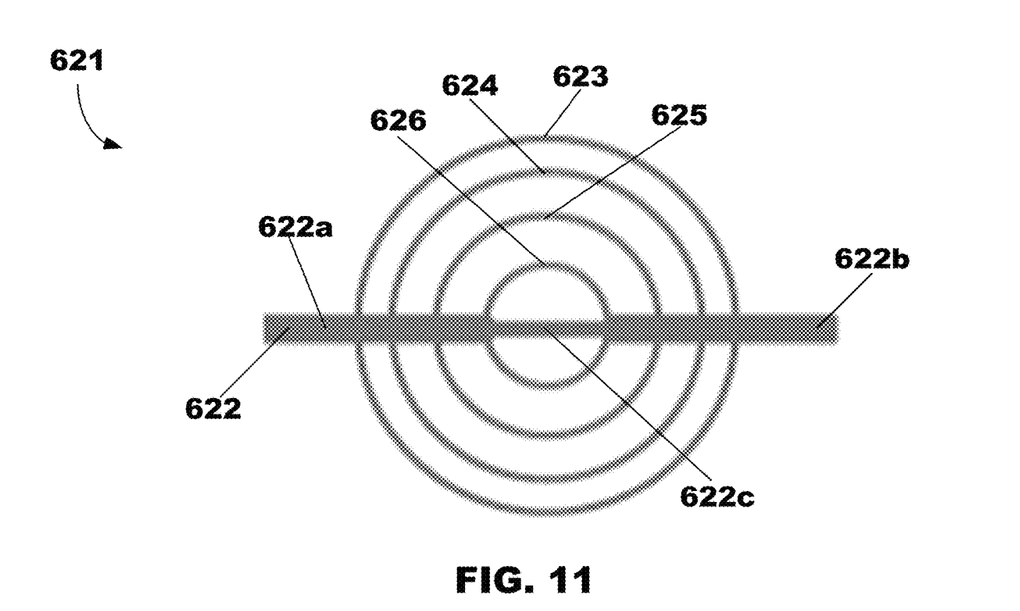
FIG. 11 illustrates an example REV having a generally circular 2D geometric configuration, in accordance with one or more embodiments shown and described herein.

In the illustrated example embodiment of FIG. 11, the REV 621 comprises a generally circular hexagonal 2D geometric configuration through which a main or primary channel 622 bisects. A plurality of branch or secondary channels 623, 624, 625, 626 branch from the main channel 622. In the illustrated embodiment, the main channel 622 comprises a first channel region 622a, a second channel region 622b, and an intermediary channel region 622c between the first channel region 622a and the second channel region 622b. The first channel region 622a and the second channel region 622b have respective channel widths that are greater than the channel width of the intermediary channel region 622c, which generates different pressure levels through the main channel 622. Distal ends of each, respective branch channel 623, 624, 625, 626 are fluidically connected at different regions of the main channel 622. A first end of each, respective branch channel 623, 624, 625, 626 is fluidically connected at a first connection interface to the first region 622a while a second end of each, respective branch channel is fluidically connected at a second connection interface to the second region 622b. By virtue of the branch channels 623, 624, 625, 626 having different channel lengths with respect to each other, different pressure levels are generated therethrough the REV 621. The pressure differential between branch channels 623, 624, 625, 626 promotes or otherwise facilitates fluid flow through the electrode layer under the ribs 16 of the FC bipolar plate 14, 15. The pressure differential is adjustable by creating optimized flow field structures having varying channel widths for each branch channels 623, 624, 625, 626.

Figure 12:
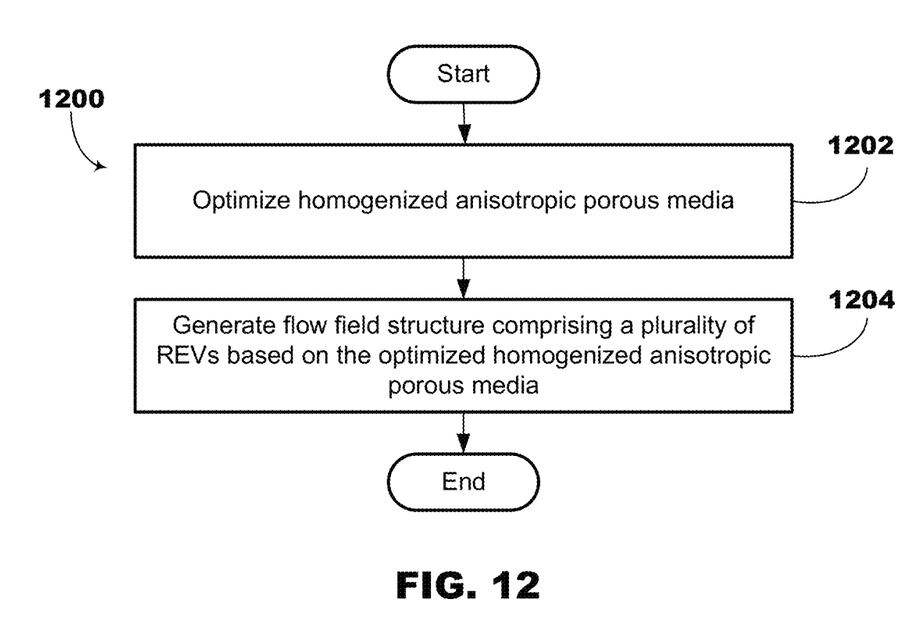
FIG. 12 illustrates a schematic diagram of an example of a method of designing fluid flow networks in a FC bipolar plate, in accordance with one or more embodiments shown.

FIG. 12 illustrates a flowchart of an example method 1200 of designing a fluid flow field in a fuel cell bipolar plate, in accordance with one or more embodiments. The method 1200 is to yield an optimized design of a fluid flow field fuel configuration that minimizes pressure drop across the fuel cell, obtains uniform reaction performance across the FC, and minimizes water accumulation or saturation. Moreover, the method is to enhance overall thermal management and operational performance of the FC.

The flowchart of method 1200 corresponds in whole or in part to the schematic illustrations of FIGS. 1 through 11 set forth and described herein. In accordance with embodiments, one or more process blocks set forth in the method 1200 may be implemented, for example, using logic instructions (e.g., software), configurable logic, fixed-functionality hardware logic, etc., or any combination thereof. As an example, software executed on one or more computing systems may provide functionality described or illustrated herein. Each computing system respectively includes one or more processors. In particular, software executing on one or more computer systems may perform one or more fabrication or processing blocks of the method 1200 set forth, described, and/or illustrated herein or provides functionality described or illustrated herein.

As illustrated in FIG. 12, in the method 1200, illustrated processing block 1202 includes optimizing, by one or more computing devices having one or more processors, homogenized anisotropic porous media by iteratively executing a gradient-based algorithm that incorporates objective functions of reaction variation and flow resistance.

The method 1200 can then proceed to illustrated process block 1204, which includes generating, based on the optimized homogenized anisotropic porous media, a flow field structure comprising a plurality of representative elementary volumes (REVs) fluidically connected to an inlet region and an outlet region of a bipolar plate body. The method 1200 can then terminate or end after execution of process block 1204.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the one or more embodiments can be implemented in a variety of forms. Therefore, while the embodiments are set forth, illustrated, and/or described in connection with particular examples thereof, the true scope of the embodiments should not be so limited since other modifications will become apparent to the skilled practitioner upon a study of the drawings, specification, and claims.

What is claimed is:

1. A bipolar plate for a fuel cell, the bipolar plate comprising:
a bipolar plate body having an inlet region, an outlet region, and a flow field structure comprising a plurality of representative elementary volumes (REVs) fluidically connected to the inlet region and the outlet region, the REVs having a structure based on flow patterns generated by homogenized anisotropic porous media optimization, wherein each of the plurality of REVs comprises a main channel and a plurality of branch channels branching from the main channel, and wherein for each of the plurality of REVs:
the main channel comprises a first channel region, a second channel region, and an intermediary channel region between the first channel region and the second channel region,
the first channel region and the second channel region have respective channel widths that are greater than the channel width of the intermediary channel region, and
the main channel bisects the plurality of branch channels.

2. The bipolar plate of claim 1, wherein the REVs are repeated throughout the flow field structure.

3. The bipolar plate of claim 1, wherein the branch channels have different channel lengths with respect to each other.

4. The bipolar plate of claim 1, wherein the REVs have different sizes at different regions of the flow field structure based on the flow patterns generated by the homogenized anisotropic porous media optimization.

5. The bipolar plate of claim 1, wherein the REVs have different orientations at different regions of the flow field structure based on the flow patterns generated by the homogenized anisotropic porous media optimization.

6. A bipolar plate fuel cell, comprising:
a multi-layer electrolyte structure interposed between a pair of bipolar plates, each fuel cell bipolar plate comprising a bipolar plate body having an inlet region, an outlet region, and a flow field structure comprising a plurality of representative elementary volumes (REVs) fluidically connected to the inlet region and the outlet region, the REVs having a structure based on flow patterns generated by homogenized anisotropic porous media optimization, wherein each of the plurality of REVs comprises a main channel and a plurality of branch channels branching from the main channel, and wherein for each of the plurality of REVs:
the main channel comprises a first channel region, a second channel region, and an intermediary channel region between the first channel region and the second channel region,
the first channel region and the second channel region have respective channel widths that are greater than the channel width of the intermediary channel region, and
the main channel bisects the plurality of branch channels.

7. The bipolar plate fuel cell of claim 6, wherein the REVs are repeated throughout the flow field structure.

8. The bipolar plate fuel cell of claim 6, wherein the branch channels have different channel lengths with respect to each other.

9. The bipolar plate fuel cell of claim 6, wherein the REVs have different sizes at different regions of the flow field structure based on the flow patterns generated by the homogenized anisotropic porous media optimization.

10. The bipolar plate fuel cell of claim 6, wherein the REVs have different orientations at different regions of the flow field structure based on the flow patterns generated by the homogenized anisotropic porous media optimization.

11. The bipolar plate of claim 1, wherein for each of the plurality of REVs the branch channels comprise a geometric configuration through which the main channel bisects.

12. The bipolar plate fuel cell of claim 6, wherein for each of the plurality of REVs the branch channels comprise a geometric configuration through which the main channel bisects.

13. A bipolar plate for a fuel cell, the bipolar plate comprising:
a bipolar plate body having an inlet region, an outlet region, and a flow field structure comprising at least one representative elementary volumes (REV) fluidically connected to the inlet region and the outlet region,
wherein the at least one REV comprises a main channel and a plurality of branch channels branching from the main channel,
wherein the main channel comprises a first channel region, a second channel region, and an intermediary channel region between the first channel region and the second channel region,
wherein the first channel region and the second channel region have respective channel widths that are greater than the channel width of the intermediary channel region, and
the main channel bisects the plurality of branch channels.

14. The bipolar plate of claim 13, wherein the at least one REV comprises a plurality of REVs repeated throughout the flow field structure.

15. The bipolar plate of claim 13, wherein the branch channels have different channel lengths with respect to each other.

16. The bipolar plate of claim 13, wherein the at least one REV comprises a plurality of REVs having different sizes at different regions of the flow field structure.

17. The bipolar plate of claim 13, wherein the at least one REV comprises a plurality of REVs having different orientations at different regions of the flow field structure.

18. The bipolar plate of claim 13, wherein the branch channels comprise a geometric configuration through which the main channel bisects.

* * * * *